(12) United States Patent
Griffiths et al.

(10) Patent No.: US 7,014,688 B2
(45) Date of Patent: Mar. 21, 2006

(54) AIR CLEANING DEVICE

(75) Inventors: George Griffiths, Skelmersdale (GB); Geoffrey Norman Walter Gay, Skelmersdale (GB)

(73) Assignee: Darwin Technology Limited, Lancashire (GB)

( * ) Notice: Subject to any disclaimer, the term of this patent is extended or adjusted under 35 U.S.C. 154(b) by 0 days.

(21) Appl. No.: 10/864,830

(22) Filed: Jun. 8, 2004

(65) Prior Publication Data
US 2004/0226448 A1 Nov. 18, 2004

Related U.S. Application Data

(62) Division of application No. 09/958,891, filed as application No. PCT/GB00/01329 on Apr. 12, 2000, now Pat. No. 6,749,669.

(30) Foreign Application Priority Data
Apr. 12, 1999 (GB) .................................. 9908099

(51) Int. Cl.
*B03C 3/28* (2006.01)

(52) U.S. Cl. ................. 96/67; 55/DIG. 5; 55/DIG. 39; 96/69

(58) Field of Classification Search ............ 96/15, 96/17, 55, 57–59, 66–69, 98–100; 95/57, 95/63, 69, 70, 78; 55/486–488, 497, 521, 55/527, 528, DIG. 33, DIG. 34, DIG. 5, 55/DIG. 35; 264/257, 258, DIG. 8, DIG. 48
See application file for complete search history.

(56) References Cited

U.S. PATENT DOCUMENTS

| | | | |
|---|---|---|---|
| 2,908,348 A | 10/1959 | Rivers et al. ................. 96/67 |
| 2,974,747 A | 3/1961 | Coolidge, Jr. et al. .......... 96/69 |
| 3,181,284 A | 5/1965 | Copenhefer .................... 96/67 |
| 3,793,802 A | 2/1974 | Hardt ............................. 96/99 |
| 3,918,939 A | 11/1975 | Hardt ............................. 96/99 |
| 4,234,324 A | 11/1980 | Dodge, Jr. ..................... 96/99 |
| 4,477,268 A | 10/1984 | Kalt ............................... 96/99 |
| 4,715,870 A | 12/1987 | Masuda et al. ................ 96/67 |
| 5,055,118 A | 10/1991 | Nagoshi et al. ................ 96/99 |
| 5,766,318 A | 6/1998 | Loreth et al. .................. 96/98 |
| 5,993,521 A | 11/1999 | Loreth et al. .................. 96/69 |
| 6,056,809 A * | 5/2000 | Chapman ....................... 96/67 |
| 6,090,189 A | 7/2000 | Wikstrom et al. ............. 96/69 |
| 6,361,589 B1 | 3/2002 | Loreth ........................... 96/67 |
| 6,398,852 B1 | 6/2002 | Loreth ........................... 96/98 |

(Continued)

FOREIGN PATENT DOCUMENTS

DE 518087 2/1931

(Continued)

OTHER PUBLICATIONS

Patent Abstracts of Japan vol. 005, No. 058, Apr. 21, 1981, Japan.

*Primary Examiner*—Richard L. Chiesa
(74) *Attorney, Agent, or Firm*—Drinker Biddle & Reath LLP

(57) ABSTRACT

A particle precipitation device for removing particles entrained in a gas stream includes an array of passages through which a gas stream can be directed relatively freely. The passages are provided between plastics walls adapted to create an electrical field within the array. The plastics walls may have areas of conductive material in contact therewith. High and low electrical potentials alternately applied to isolated areas of the conductive material provide charged sites in the array for collecting particles from the gas stream. Alternatively, the plastics walls may have electret properties.

27 Claims, 11 Drawing Sheets

U.S. PATENT DOCUMENTS 6,524,488 B1 * 2/2003 Insley et al. ................ 210/767
6,749,669 B1 * 6/2004 Griffiths et al. ................ 96/67

FOREIGN PATENT DOCUMENTS

| GB | 2 308 320 A | | 6/1997 | |
| --- | --- | --- | --- | --- |
| JP | 56-10314 | * | 2/1981 | |
| JP | 56010314 A | | 2/1981 | |
| JP | 6-47232 | * | 2/1994 | ............ 55/DIG. 39 |
| WO | 98/39100 | | 9/1998 | |
| WO | 99/07474 | | 2/1999 | |

* cited by examiner

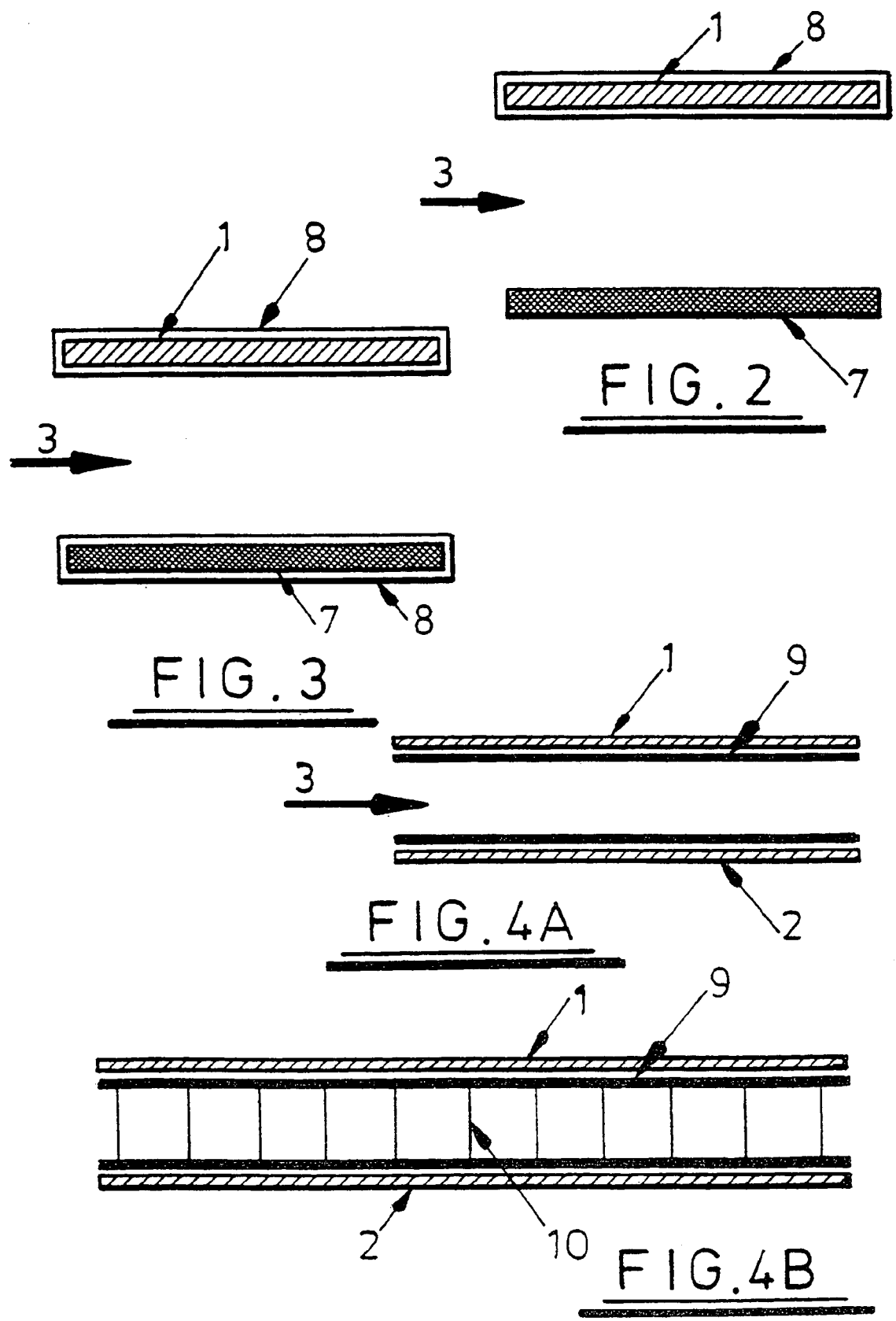

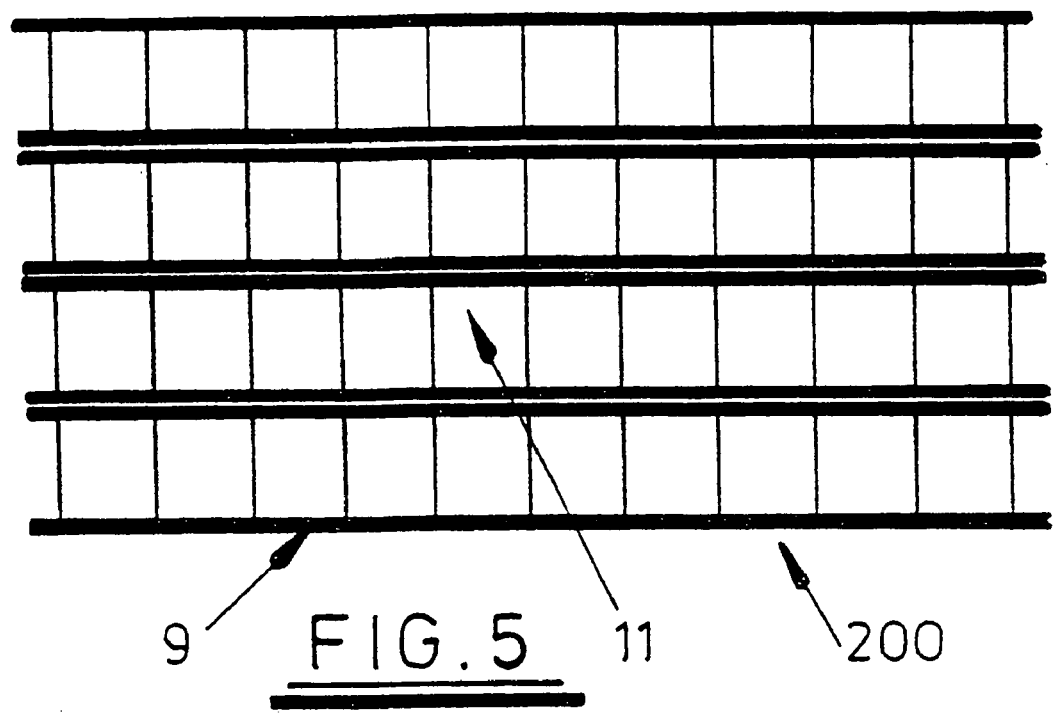
9  FIG.5  11  200
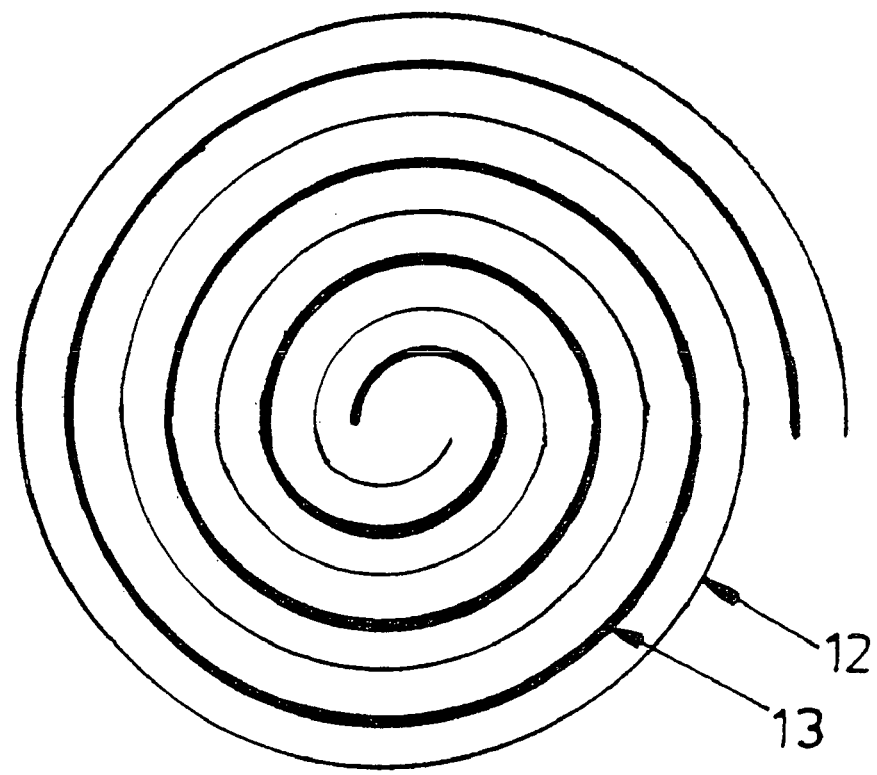
FIG.8

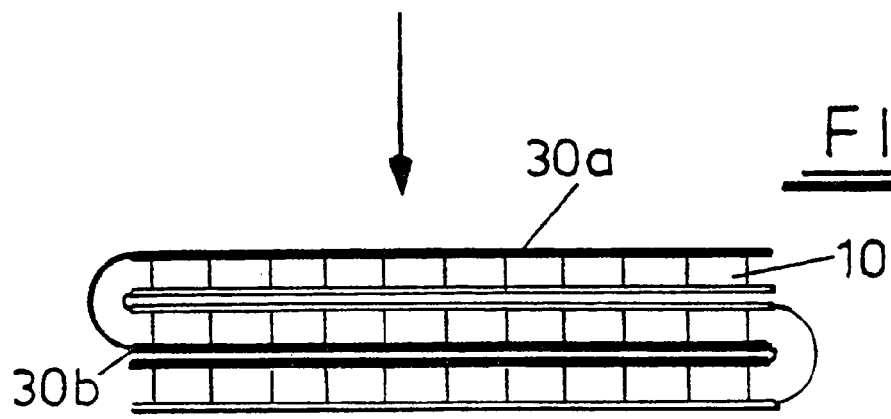
FIG. 9
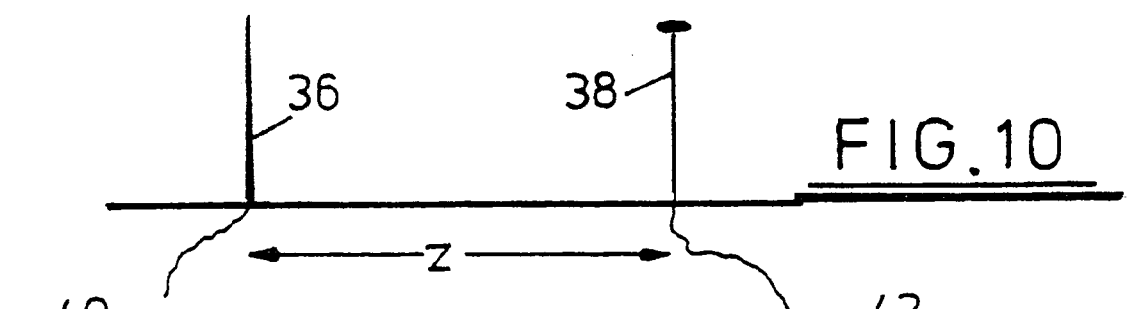
FIG. 10
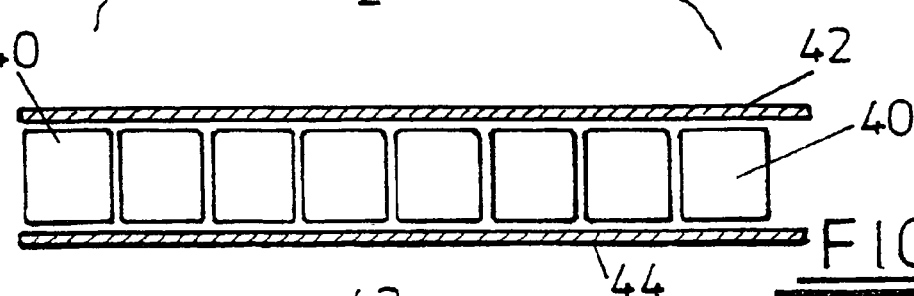
FIG. 11
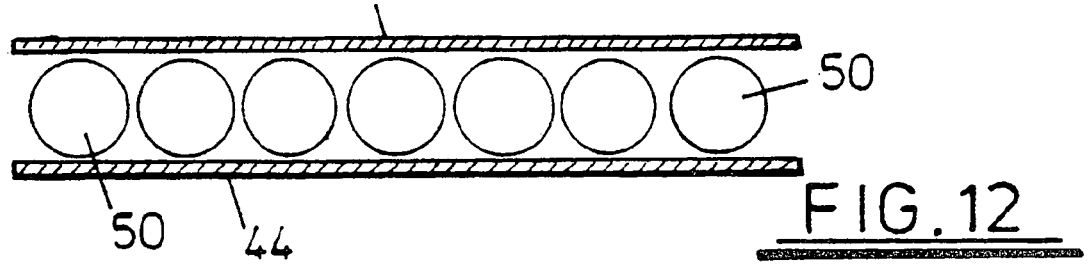
FIG. 12

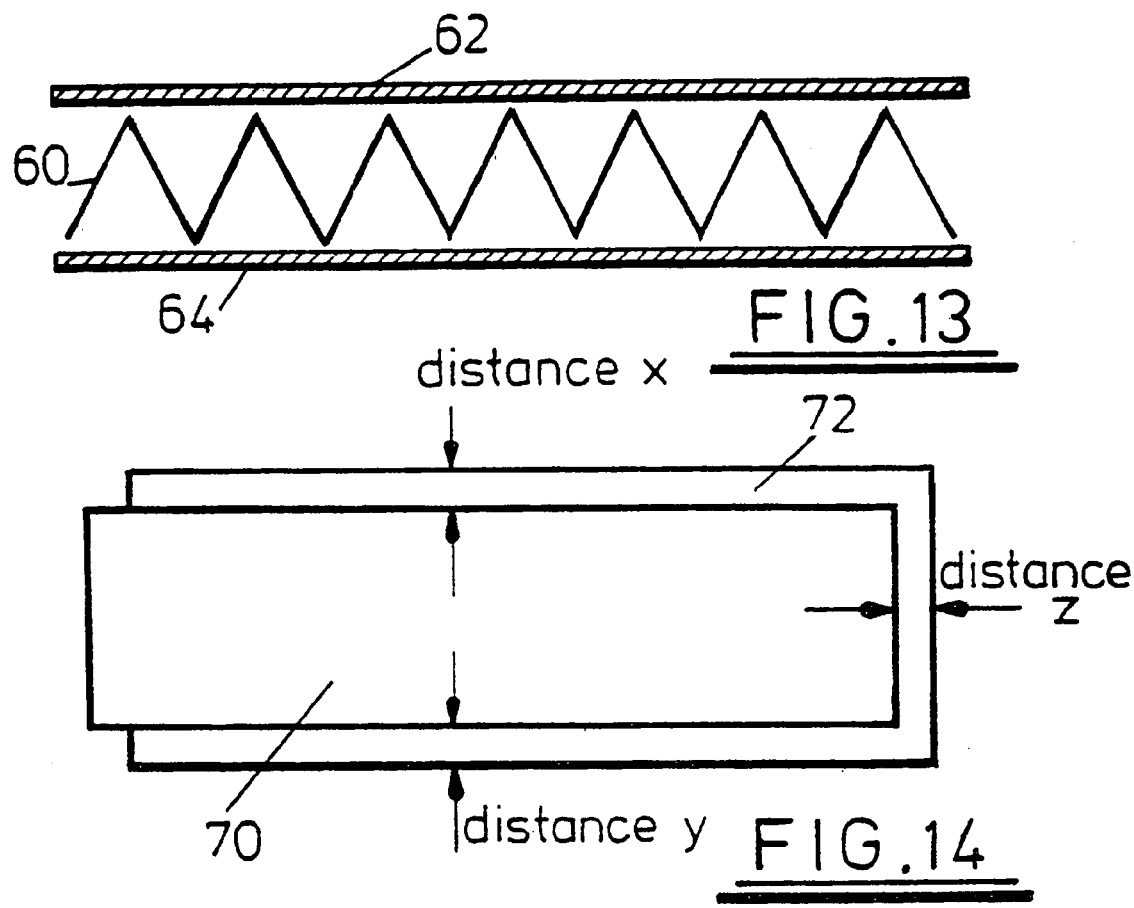
FIG. 13
FIG. 14
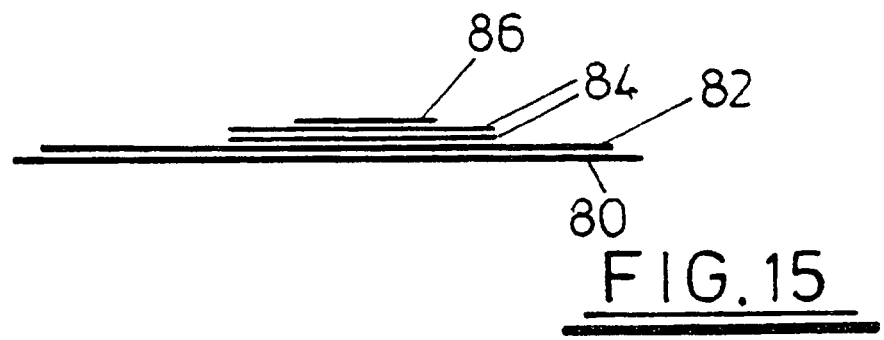
FIG. 15 o° - Free ions
● - Particles
🦟 - Charged particles

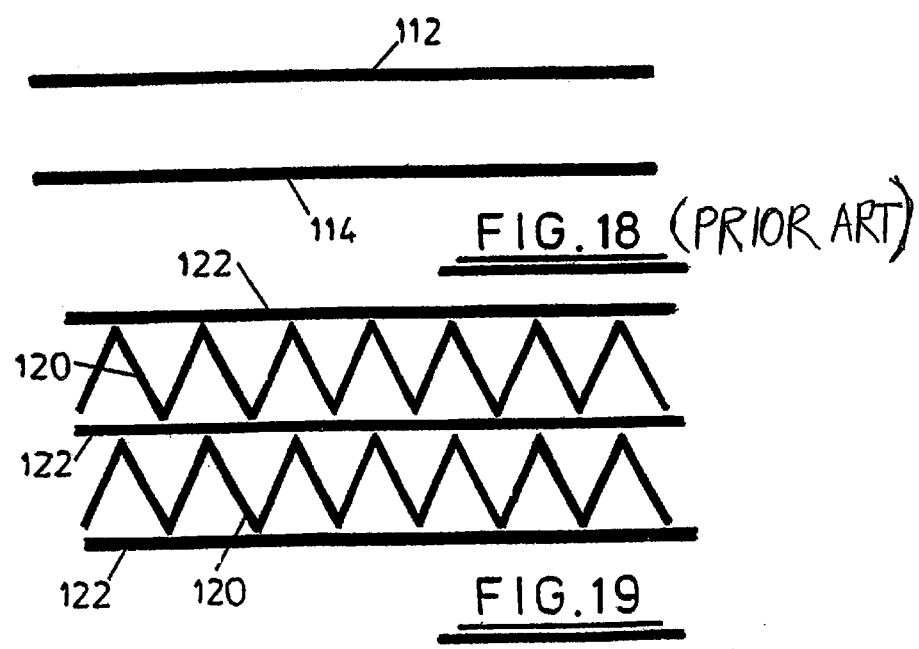

AIR CLEANING DEVICE

This is a divisional of application Ser. No. 09/958,891, filed 5 Feb. 2002, now U.S. Pat. No. 6,749,669, which is the national stage application of international application PCT/GB00/01329 with an international filing date of 12 Apr. 2000.

This invention relates to an air-cleaning device for reducing aerosol concentrations in a confined space such as a factory, shed, greenhouse, hall, shopping mall or room.

High aerosol concentrations can pose a health hazard through breathing the suspended particles.

In farming high aerosol concentrations are found in situations such as poultry sheds and intensive pig rearing sheds etc., the health of both workers and animals is at risk.

In industry a variety of processes such as welding, grinding, smelting and use of internal combustion engines in confined spaces all produce high polluting aerosol concentrations in enclosed spaces.

In social and domestic situations, aerosol pollution is produced by tobacco smoking. Sneezing can produce aerosols of bacteria and viruses. Allergy producing pollen is found in high concentrations at various times of the year. Dust mite allergen particles are produced when making up beds and enter the air as an aerosol.

Conventional air cleaners remove particles from the air by trapping them either in filters (filtration air cleaners (FAC's)) or by collecting them on plates (electrostatic precipitation air cleaners (ESPAC's)). The filters or plates may then be disposed of, washed or replaced.

The disadvantages associated with FAC's are:
1. The efficiency of the filter often drops off markedly with time.
2. The pressure drop across the filter is often high and so requires a powerful fan.
3. The powerful fans are often noisy and consume considerable power.
4. The filters need to be regularly replaced.

The advantages associated with ESPAC's are:
1. Lower pressure drop.
2. Low noise and low power.
3. Washable collection plates.

The disadvantages associated with ESPAC's are:
1. Costly shielding of the high voltage metal collecting plates. The user needs to be protected from the possibility of electrical shock from the high voltage power supply (typically several kilovolts). Even when the power supply is switched off, there is danger of shock from stored electrical charge on the plates. The plates need to be removed for cleaning and so a safety interlock is usually provided to automatically discharge the plates before gaining access to them.
2. Loss of efficiency and generation of ozone caused by electrical breakdown and leakage between the metal plates.
3. The plates need to be relatively widely spaced to reduce electrical breakdown in the air between the plates. This reduces efficiency.

An object of the present invention is to provide a practical device for use in removing particles from an air or gas stream substantially without the disadvantages associated with ESPAC's.

According to a first aspect of the invention there is provided a particle precipitation device for removing particles entrained in a gas stream comprising an array of passages through which the gas stream can pass relatively freely, the passages being provided between plastics walls, means for urging the gas stream through the array, the plastics walls having areas of conductive material in contact therewith, and means for applying high and low electrical potentials alternately to isolated areas of the conductive material to provide charged sites in the array for collecting particles from the gas stream.

According to a second aspect this invention provides a particle precipitation device for removing particles entrained in a gas stream comprising an array of passages through which the gas stream can pass relatively freely, the passages being provided between plastics walls having electret properties, means for urging the gas stream through the array, whereby particles are collected from the gas stream in the passages.

The passages are preferably provided by fluted plastics sheet preferably having conductive material on opposite faces thereof. The fluted plastics sheets may, for example, be overlaid one on top of the other, folded in concertina fashion, formed into a spiral, or in a concentric array.

Alternatively, the passages may be provided by plastics tubes arranged side by side. The plastics tubes may be of rectangular cross-section or of circular cross-section.

Yet again the passages may be formed between walls of corrugated plastics sheet or between flat plastics sheets and corrugated conductive material.

The plastics material used in the invention is preferably of polypropylene, polyethylene or a copolymer thereof. Although other plastics materials such as PVC, PET, PTFE and polycarbonate may also be suitable.

For embodiments of the first aspect of the invention the areas of conductive material are preferably of high impedance material but may be of low impedance material. Alternate plastics sheets may have respectively areas of high impedance material and low impedance material thereon.

The high impedance material is preferably cellulose based material, such as paper. Alternative high impedance materials include paint or ink or anti-static coatings.

The low impedance material may be selected from metal sheet, metal film, carbon based films and carbon based paints.

The conductive material is preferably spaced inwardly from edges of the plastics walls except where connection is made to the means for applying potential thereto.

Preferred embodiments of the invention further comprise means for electrically charging particles in the gas stream prior to the array of passages. Such means may be corona discharge means or radioactive ionisation means.

Preferred embodiments of the first aspect of the invention comprise alternate layers of fluted plastics sheet conductive material at high and low electrical potentials, wherein the conductive material is spaced inwardly from edges of the plastics sheets to induce leakage of high voltage and hence ion leakage for charging particles entering the device. The areas of low electrical potential are preferably at ground potential.

High impedance material used in the invention preferably has a thin film resistivity in the range of $10^9$ to $10^{11}$ ohms per square.

Devices of the first aspect of the invention preferably comprise a high voltage power supply for powering the high electrical potential areas and a connection lead between the power supply and those areas made of insulated high impedance material.

Devices of preferred embodiments of the invention further comprise means for ionising the gas stream as it leaves the array. The means for ionising the gas steam as it leaves the array preferably comprises a primary corona discharge emitter and a secondary corona discharge emitter at a lower potential to the primary emitter. The primary emitter is preferably connected to high negative potential whilst the secondary emitter is preferably earthed. The primary emitter is preferably a needle having a sharp tip and the secondary emitter is preferably a needle having a relatively blunt tip.

In preferred embodiments of the second aspect of this invention the plastics walls are electrically charged prior to inclusion in the device. The plastics walls may be charged by means of electrodes applied to opposite sides of the walls with a high voltage difference applied thereto. Alternatively, the plastics walls may be charged by applying an electric field at a higher temperature and then cooling to a lower temperature in the presence of the electric field. The plastics walls may also be charged by moving the plastics walls between a high potential corona discharge on one side and an earthed conductive plate on the other side.

In another preferred embodiment of the second aspect of the invention the plastics walls may be provided by faces of fluted plastics sheet material and charging may be by means of filling the flutes with a conductive liquid connecting the flute insides to ground potential and outer faces of the sheet material to high negative and positive potentials respectively.

Another means of charging the plastics walls may be by feeding them between rollers of conductive or semi-conductive material maintained at high and low electrical potentials respectively.

It is also preferred that opposed sides of the walls are rendered conductive and electrically connected together. The plastics walls may be rendered conductive by application of a conductive coating or a conductive sheet material.

Devices of the invention generally comprise a series of spared plates that are alternately at high and low electrical potential. The high potential plates are electrically isolated from the low potential plates. The high potential plates may be positive or negative with respect to the low potential plates. The low potential plates may form a linear spaced array of plates or a circular spaced array of plats or a spiral spaced array of plates or other conveniently spaced array. The high potential plates are fabricated from a special high impedance material and not from metal (which is a low impedance material (LIM)). The high impedance material (HIM) of the high potential plates allows the plates to rise to their full working electrical potential but disallows them being a shock hazard. When the high impedance (HIM) high potential plates are touched by a person e.g. the user, the current flow is restricted to a low value which causes no shock and no hazard to health. As a result the series of spaced collector plates need no longer be hidden for protection within the air cleaner, but instead can if required be mounted externally for easy access and removal for washing of the plates.

The high potential plates need to be powered from a high voltage power supply. According to the present invention there is also provided a special lead for the purpose of connection to the high potential plates made of high impedance material (HIM). The HIM lead would be insulated with a plastic in the conventional manner, but if the insulation was breached the lead would not present a shock hazard due to the limitation of low current flow from within the lead.

Air entering the series of spaced plates is blown or drawn through the array of plates typically by use of an electrically driven fan. As they pass through the plates, the charged particles (positively or negatively charged) and any electrically neutral particles are subject to a strong electrical field which results in their being drawn to and collected on the plates. The plates can be designed to be either disposable or washable.

In one preferred embodiment both the high potential and low potential sets of plates are made of HIM.

In another preferred embodiment of the invention, the high potential HIM plate is covered with an insulation film.

In yet another preferred embodiment of the invention, both the high potential HIM plates and the low potential plates are covered with an insulation film.

In an alternative preferred embodiment, the gap between the high potential and low potential plates is occupied by an insulating plastics twin-wall fluted sheet material through which air passes.

In another preferred embodiment, the high potential and low potential plates sandwiching the insulating plastics twin-wall fluted sheet material are initially connected to the high voltage power supply and then disconnected.

Particle collection devices of the invention may be based on an electret which is a piece of dielectric material exhibiting a long-lasting electric charge. The electret charge may consist of surface charge layers, charges within the dielectric, polarisation charges or combinations of these.

A thin film electret exhibits an external electrostatic field if its polarisation and space charges do not compensate each other everywhere in the dielectric. This external electrostatic field is utilised in air cleaning filter material manufactured from thin film polymer electret. The thin film polymer is electrically charged to produce a non-woven filter fabric. When air containing suspended particles is passed through the fabric the particles are subjected to strong electrostatic fields as they approach the electret fibres. These forces result in deposition of the particles on the fibres. This fibrous electret polymer filter material has an advantage over conventional fibrous filter media (such as microfine glass fibres) in that high efficiencies can be achieved at relatively low pressure drops.

However, there is a further requirement for a filter medium which can provide high efficiency at even lower pressure drops.

Plastics sheet materials, especially plastics twin-wail fluted plastics sheet material, may be pretreated to give it electret properties, and that material used in an air-cleaning collection device. Plastics materials suitable for the manufacture of the sheet materials include polyethylene (PE), polypropylene (PP), co-polymers of ethylene and propylene, PVC, PET, PTFE, polycarbonate and others. The plastics materials used preferably provide passages through which air passes readily through the flutes and so the pressure drop through such an air-cleaning array is small. Particles in the air stream passing through are subject to strong electric fields within the passages. Charged particles move in the electric field (by a process termed electrophoresis) toward the passage walls where they adhere and are thus captured.

Because the electric field in the passages is non-linear uncharged or neutral particles also move (by a process termed dielectrophoresis) toward the walls and are captured.

Whereas most electret air cleaning materials are manufactured to exhibit external electric fields on the surface of polymer films, in this invention care is taken to maximise the electric field strengths inside the air space within the passages of the plastics material.

This invention will now be further described, by way of example only, with reference to the accompanying drawings, in which:

FIG. 2 shows schematically a second embodiment of the invention;

FIG. 3 shows schematically a third embodiment of the invention;

Figure 6:
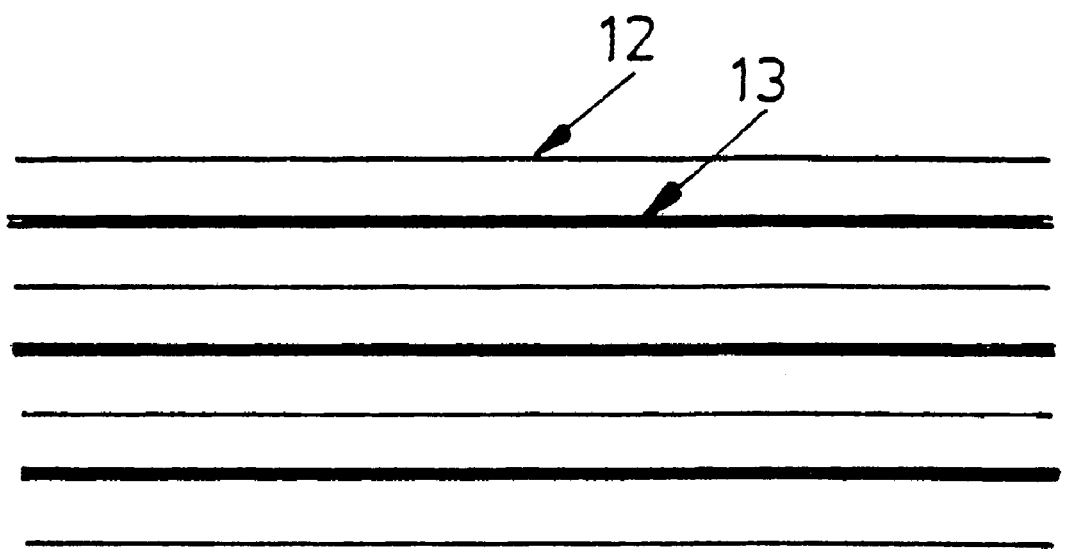
Figure 7:
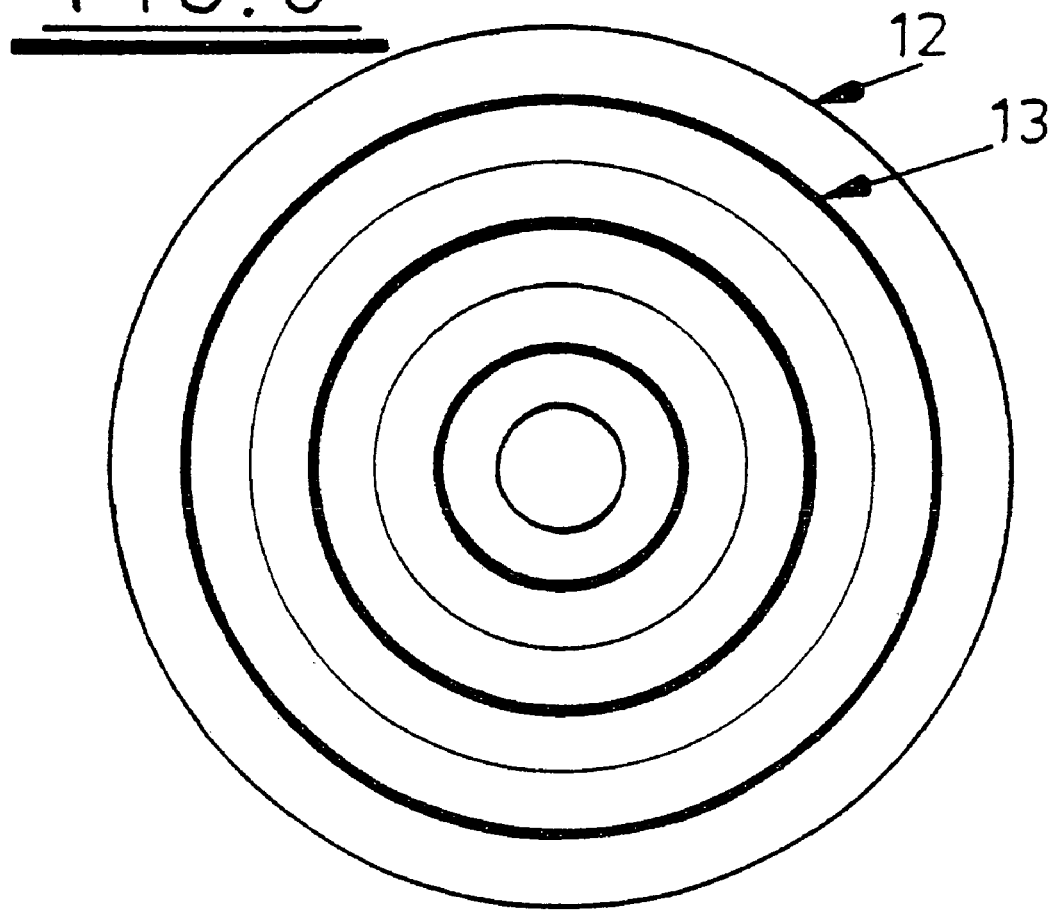
Figure 16:
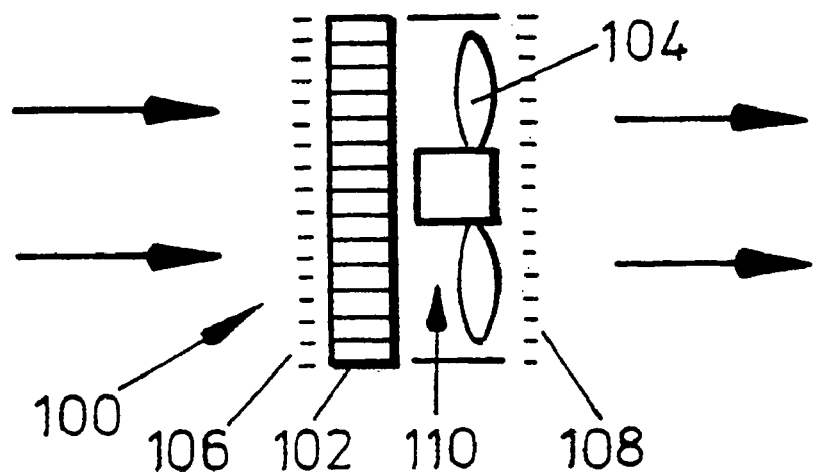
Figure 17:
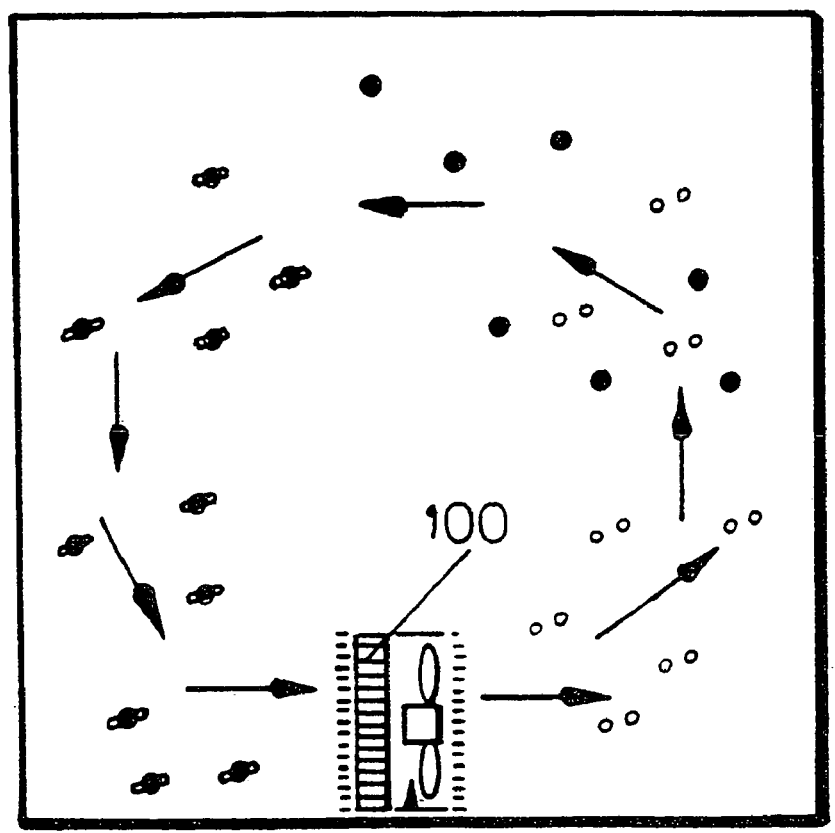
Figure 20:
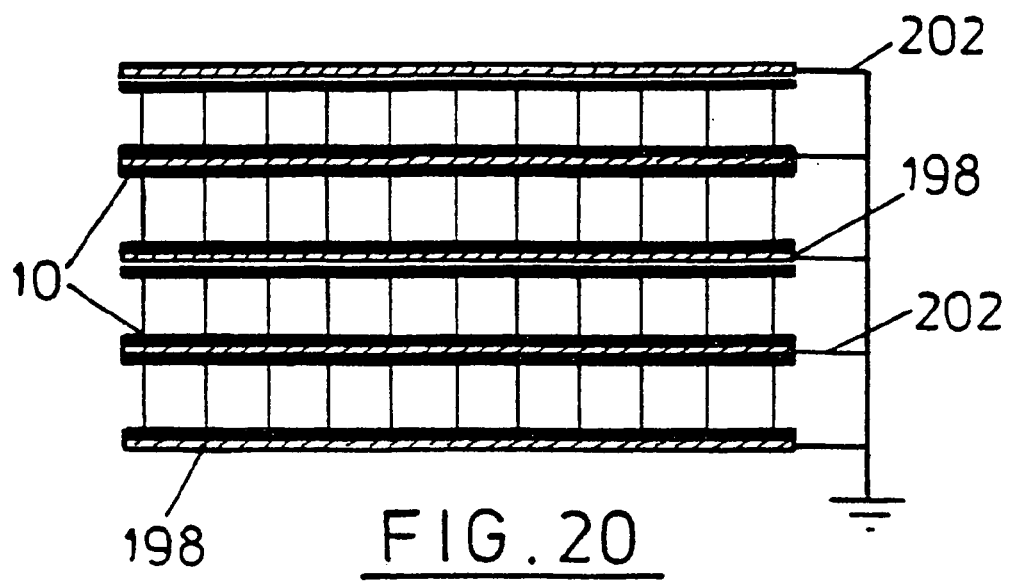
Figure 21:
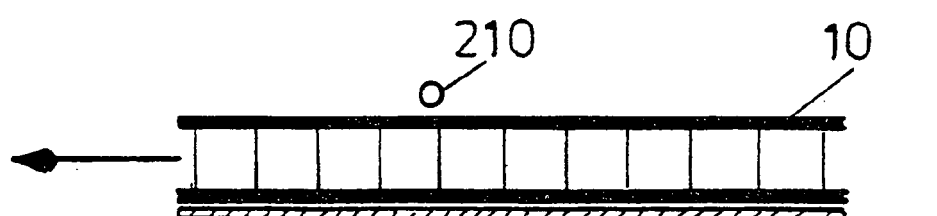
Figure 22:
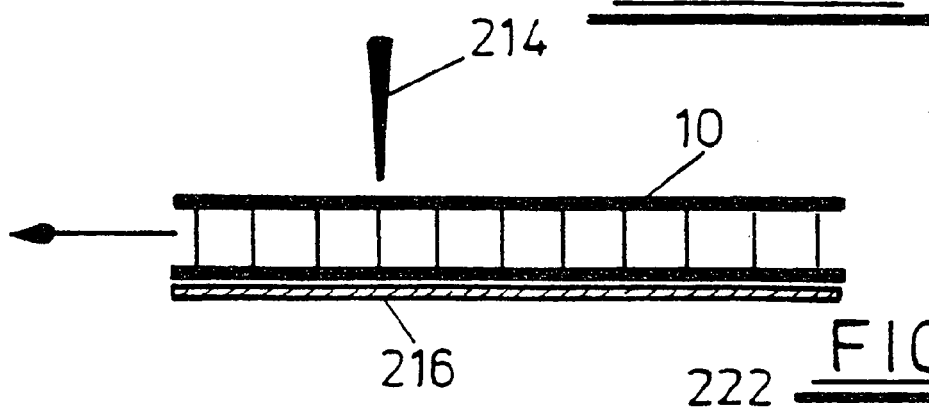
Figure 23:
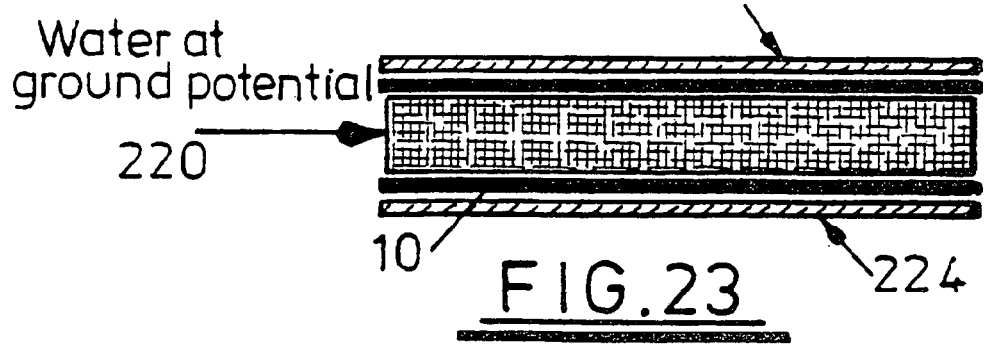
Figure 24:
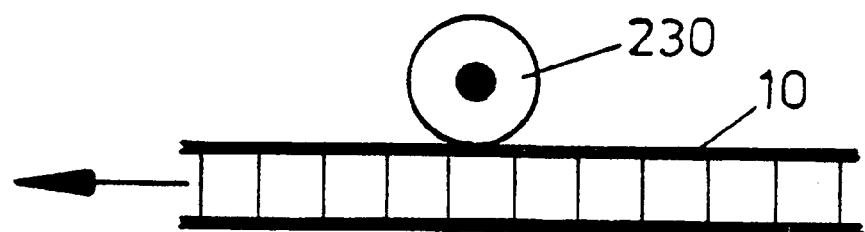
Figure 25:
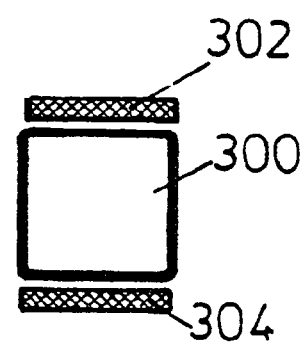
Figure 26:
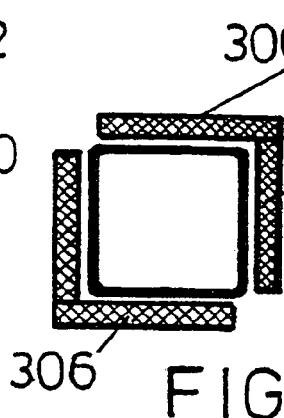
Figure 27:
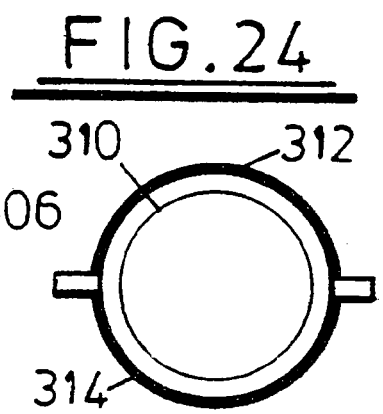
Figure 28:
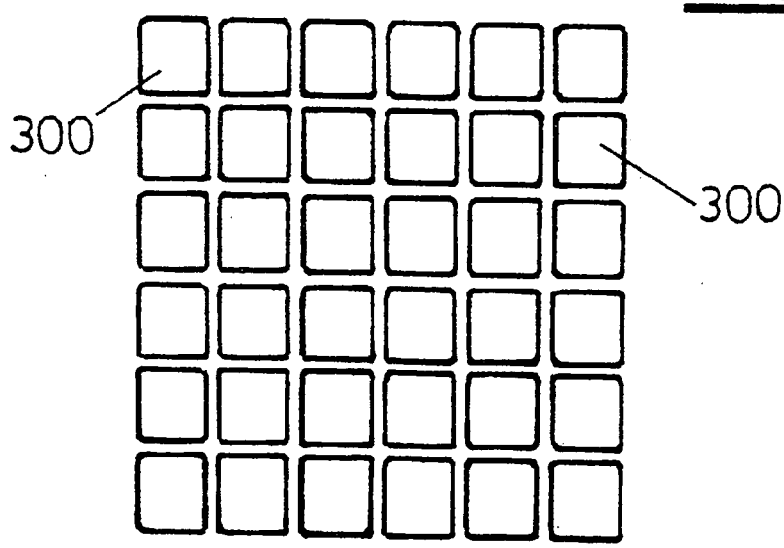
Figure 29:
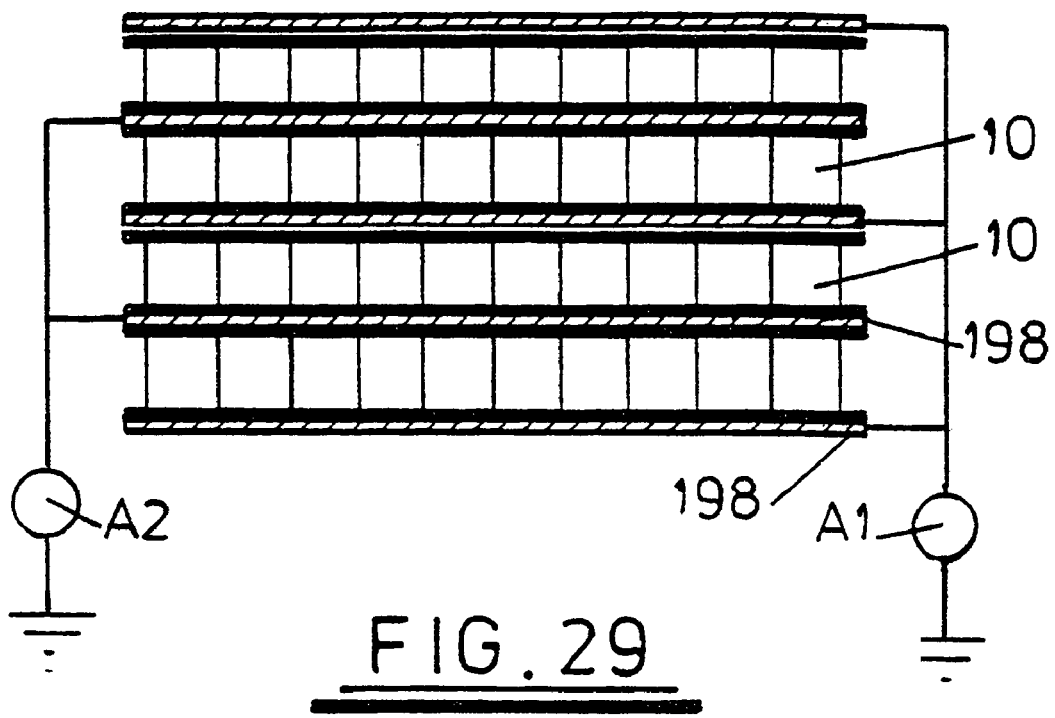
Figure 30:
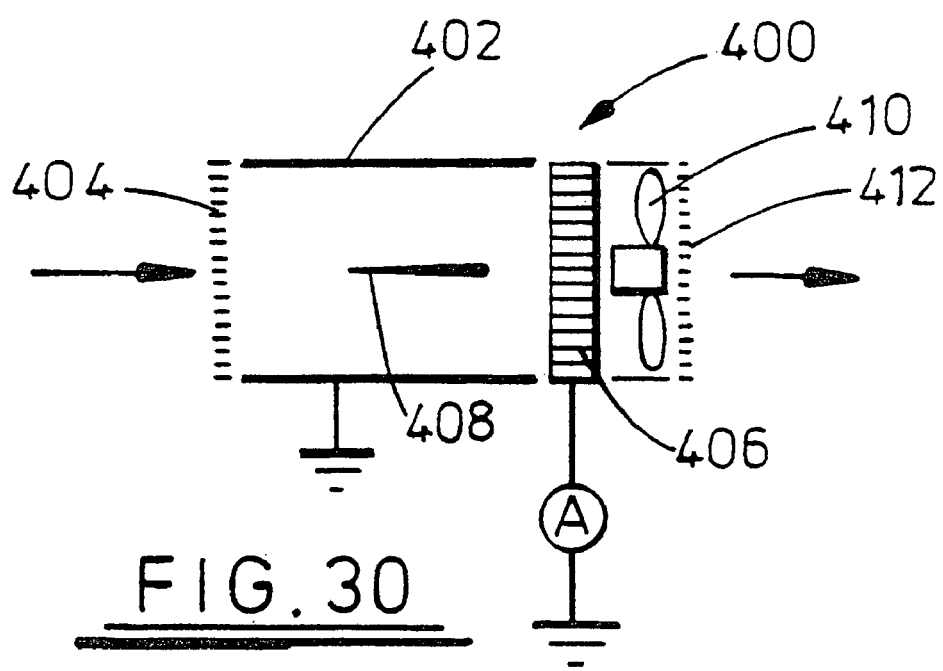

FIGS. 4A and B shows schematically a fourth embodiment of the invention;

FIG. 5 shows schematically a fifth embodiment of the invention;

FIG. 6 shows schematically a linear spaced array of plates;

FIG. 7 shows schematically a circular spaced array of plates;

FIG. 8 shows schematically a spiral spaced array of plates;

FIG. 9 shows schematically a ninth embodiment of the invention;

FIG. 10 shows schematically a system for charging particles in an air stream;

FIG. 11 shows schematically a tenth embodiment of the invention;

FIG. 12 shows schematically a eleventh embodiment of the invention;

FIG. 13 shows schematically a twelfth embodiment of the invention;

FIG. 14 shows schematically a system for producing ion leakage for charging particles in an air stream;

FIG. 15 shows schematically a system for reducing risk of electrostatic shock from devices of the invention;

FIG. 16 and 17 shows schematically operation of particle precipitation devices of the invention;

FIG. 18 shows schematically a prior art electrostatic air cleaner;

FIG. 19 shows schematically a thirteenth embodiment of the invention;

FIG. 20 shows a fourteenth embodiment of the invention;

FIG. 21 shows schematically a first means of electret charging of collector plates for devices of the invention;

FIG. 22 shows a second means of electret charging of collector plates for devices of the invention;

FIG. 23 shows a third means of electret charging of collector plates for devices of the invention;

FIG. 24 shows a fourth means of electret charging of collector plates for devices of the invention;

FIG. 25 shows schematically a fifteenth embodiment of the invention;

FIG. 26 shows schematically a sixteenth embodiment of the invention;

FIG. 27 shows schematically a seventeenth embodiment of the invention;

FIG. 28 shows schematically an eighteenth embodiment of the invention;

FIG. 29 shows schematically a charged particle detector according to the invention;

FIG. 30 shows schematically a particle pollution measuring device according to the invention.

In the following description of FIGS. 1 to 8 of the drawings, like parts have been given the same reference numbers for simplicity and mainly differences between embodiments will be described in detail.

Figure 1:
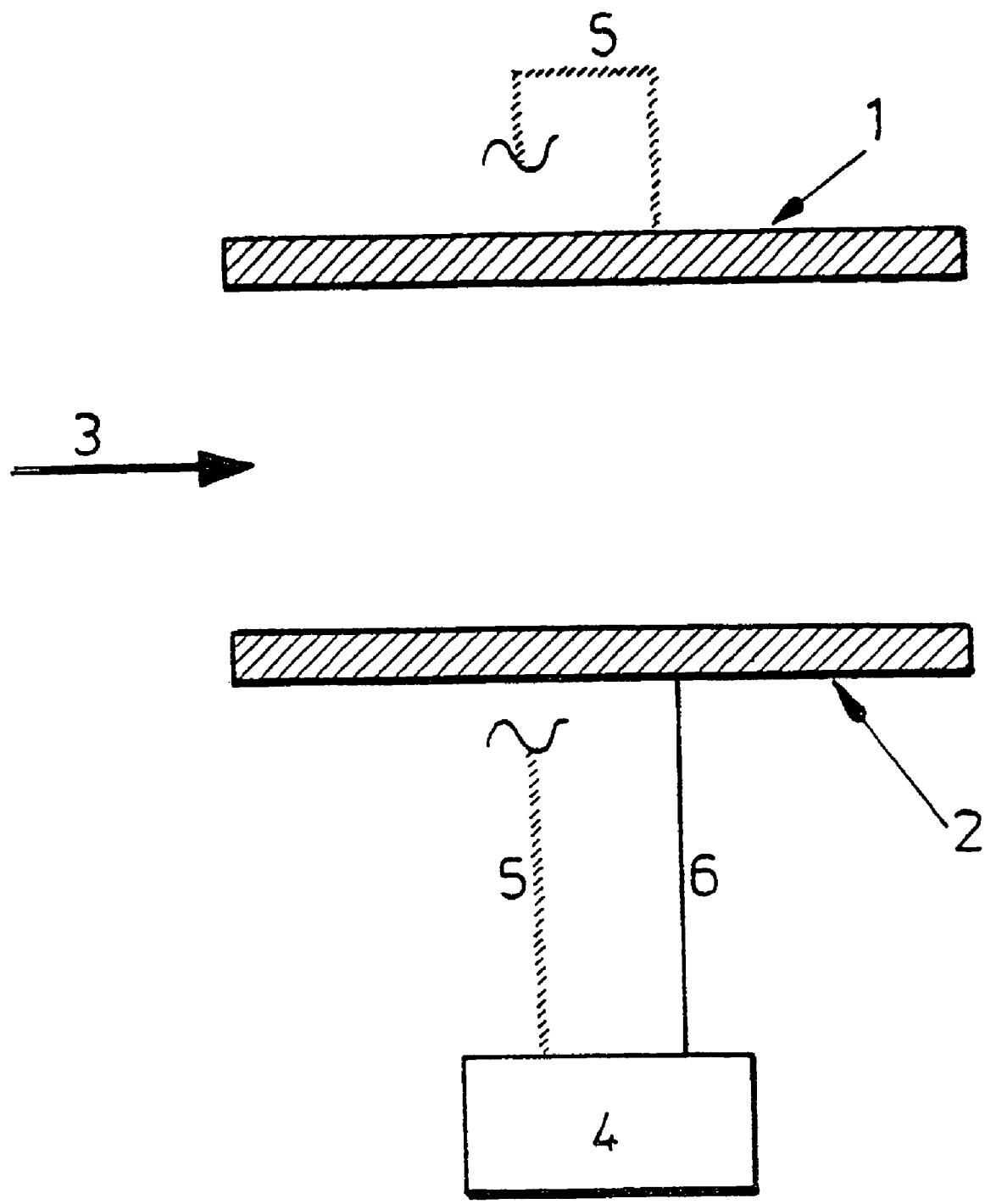
FIG. 1 shows schematically a first embodiment of the invention.

Referring to FIG. 1 of the accompanying drawings a particle precipitation device comprises at least two plates 1 and 2 (for simplicity only two plates are shown) separated so as to allow a substantially free flow of air or gases 3 between the plates.

Plate 1, which is at high electrical potential, is constructed of or coated with a high impedance material (HIM). The plate need not be thick, 1 mm or less will serve for most purposes. Suitable high impedance materials include card, cardboard, paper adhesive cellulose tape and a range of other materials. Alternatively, plate 1 may be of an insulating plastics material coated With a HIM film. Such coating materials include certain plastics certain special paints and certain anti-static coatings. Suitable high impedance material (HIM) preferably has a thin film resistivity in the range of $10^6$ and $10^{11}$ ohms per square. By comparison low impedance materials (LIM) typically have thin film resistivities of 0.1 to 1.0 ohms per square for metals of approximately 50 microns thickness and 10 to 1000 ohms per square for carbon paint films of 50 microns thickness. Surface resistivities of insulators and insulation material are typically in the range of $10^{13}$ to $10^{16}$ ohms per square.

A high voltage power supply 4 is connected by a special lead 5 to the high voltage plate 1. The lead 5 is constructed of a conducting core of HIM surrounded by a sheath of insulating material. The HIM lead 5 needs to be sufficiently conductive to supply the plate array with current sufficient to maintain high potential, but not conductive enough to cause a shock to the user if the insulation material is breached. A number of materials can be used to construct the core of lead 5, including cellulose string or similar materials as used in the high impedance materials of the plates.

Plate 2 is a low voltage plate and is constructed of HIM. Plate 2 is connected via a conventional insulated metal conductor cored lead 6 to the power supply 4. Plate 2 is at low or ground potential, poses no electrical shock hazard and so may also be constructed of more conductive material, such as metals, metal foils or carbon coated plastics.

As an example, an array of 13 HIM plates was constructed of cellulose card 0.4 mm thickness with a separation distance between plates of 4 mm. The array was 100 mm deep in terms of airflow distance through the array. Air was passed through the array 2.0 m/s. The high potential HIM plates were held at −13 kilovolts d.c. with respect to the low potential plates. Air passing through the array contained approximately 500 micrograms per cubic metre of negatively charged salt particles of mean diameter 0.5 microns. The efficiency of capture was determined to be 93%.

In the embodiment of FIG. 2 (which, for clarity, does not show the power supply and connection) the high potential HIM plate 1 is covered or coated with insulation 8. This reduces leakage and loss of electrical potential on the plate if high and low potential plates are bridged by dirt or foreign bodies.

The insulation 8 may be a film or films of non-conducting paint, a plastics tape film, a heat-sealed plastics film or other suitable insulation.

The low potential plate 7 can be constructed of high impedance material or metallic conducting material, material coated with conductive carbon paint, conductive carbon-loaded plastics or any other similar suitable material.

In the embodiment of FIG. 3 both the upper high potential plate 1 and the lower low potential plate 7 are covered or coated with insulation 8.

The high potential plate is constructed of high impedance material covered with insulation 8.

The low potential plate may be constructed of any suitable high or low impedance material and the plate is covered with insulation 8.

An advantage of having both sets of plates insulated is that even if the plates touch together there is no loss of high voltage potential and therefore no loss of function.

In the embodiment of FIG. 4a and 4b both the high and low potential plates are separated by an insulating plastics twin-wall fluted sheet material 9. Sheet material 9 may be made out of polypropylene, polyethylene, polycarbonate, P.T.F.E. or other suitable insulating, materials. FIG. 4a illustrates airflow through the flutes. FIG. 4b represents a view at right angles to FIG. 4a as if the air is flowing into the page. Air can flow freely through the flutes of the plastics sheet material 9. The flute walls 10 are an integral part of sheet material 9. The fluted plastics sheet material 9 is rigid in structure and lends itself to the simple building of a multiple plate array.

The preferred material of the high and low potential plates is high impedance material (HIM) but as the twin-wall plastics fluted sheet material 9 is a good insulator, then a low impedance material may be suitable.

In the embodiment of FIG. 4 precipitation of particles is effected by applying a continuous high electrical potential between the high potential plate 1 and the low potential plate 2.

As an example, a circular array of diameter 410 mm and depth 100 mm was constructed using a stack of insulating plastics twin-wall fluted sheet material (IPTFSM) separated by high and low potential plates made of HIM. The IPTFSM which was constructed of polypropylene, had an open air spacing of 4 mm. The wall thickness of the IPTFSM was 0.4 mm. The HIM used was adhesive cellulose tape of thickness 0.13 mm. The high potential HIM plates were held at −10 kilovolts dc with respect to the low potential plates. Air (containing a negatively charged aerosol of approx. 500 micrograms per cubic meter of salt particles of mean diameter 0.5 microns) was passed through the array at a mean velocity of 1.8 m/s. The clear air delivery rate (CADR) was measured as 717 cubic meters per hour.

In a further embodiment (refer to FIG. 4 again) an initial high potential is applied between the two plates and then the high voltage supply is disconnected. Efficiency at particles capture may be expected to drop off, but this is not found to be the case. It appears that the initial high electric filed strength generated between the plates causes the fluted plastics sheet material 9 to form an electret material which stores immobilised charge within 9. The electric field strengths generated by this immobilised stored charge are sufficiently strong to precipitate particles on the walls of the flutes of material 9.

Yet another embodiment involves using a stacked array 11 as an air cleaning collection device without any pre-treatment of the fluted sheet material 9. These sheet materials are often manufactured by extrusion of molten plastic and the pristine material usually has some degree of electret properties and displays air cleaning properties without any further treatment.

FIGS. 6, 7 and 8 represent linear, circular, and spiral spaced arrays of plates respectively. In each case the high potential plate is denoted 13 and the low potential plate 12. Air flow is as if into the page.

FIG. 9 of the accompanying drawings shows how an air filter can be made from twin walled fluted plastics sheet 10. Outer faces 30*a* and *b* of the sheet are coated or covered with a conductive or highly resistive electrode material. The sheet material is then folded in concertina fashion to form an overlapping array of air passages. One outer face 30*a* is designated as the high potential side and the other 30*b* as the low potential side. The faces 30*a* and 30*b* are duly connected to high and low potential sources to provide the necessary electrical field for inducing charged sites within the flutes onto which aerosol particles can be attracted from an air stream passing through the flutes. Not shown is a fan or other means for drawing or blowing air through the array.

In embodiments of the invention, it may be desirable to pre-charge particles before they enter the filter array. This may be achieved by means of two ion emitters 36, 38 placed in a plastics airflow exit duct of an air filter of the invention. One of the emitters 36 has a sharp point, typically having a radius of curvature of tip of less than 0.1 mm, at a high negative potential and is positioned a distance z from ion emitter 38 having a blunt tip (radius of curvature of the tip being typically 0.5 mm to 2.0 mm).

As a result of the high electric field strength between the emitters, both emitters go into corona emissions. The sharp emitter 36 emits negative ions in abundance. The blunt emitter 38 emits positive ions in smaller quantities. The negative ion stream essentially neutralises the positive ion stream. The net effect of blowing air across both emitters resulting in a departing cloud of negative ions.

These ions exit the air-cleaning machine and go towards diffusion charging of the particles in the room. Air ions produced by virtue of the ion emitters are blown into the room where by diffusion charging they impart a small amount of electrical charge to the particles in the room. As the charged particles are drawn into the air-cleaning machine they are captured by the electrostatic fields within the flutes of the sheet materials. It is desirable to place the ion emitters inside the air-cleaning machine to reduce both local deposition and to reduce the possibility of electrostatic shock. External ion emitters produce local dirt deposition in the vicinity of the emitters and can also pose an electrostatic. nuisance to the users of the air cleaner. This contrasts with the use of two sharp emitters. If two sharp emitters are used there is more abundance of positive ions. Positive ions in the exit air stream will effectively neutralise negatively charged particles and thus reduce the efficiency of particle capture in the flutes. Optimisation of negative ionisation (and hence mono-polar charging) is achieved by adjusting emitter potentials, radius of curvatures of emitter tips, distance z and airflow direction and velocity.

FIG. 11 shows schematically an embodiment of the invention in which the insulating twin wall plastics sheet materials is replaced by an array of square plastics insulating tubes 40 sandwiched between electrode material layers 42, 44.

The air flows down the lengths of the square tubes 40 in the same way that the air flows through the flutes of the sheet material. The square flutes would advantageously be manufactured by a continuous plastics extrusion process and the tubes cut to appropriate length to suit different air cleaning applications. The individual tubes would be aligned as shown with high and low potential electrode material 42, 44 to sandwich the square tubes.

Alternatively as shown in FIG. 12 of the drawings, circular section plastics tubes 50 may be used, again sandwiched between the electrode material 42, 44.

Turning to FIG. 13 of the drawings, particle collecting device of the invention may have air flow passages provided between folds of corrugated or wave-like plastics sheets 60 sandwiched between sheets of electrode material 62, 64 at high and low electrical potentials respectively.

Air containing particles is drawn or blown along the corrugations. This type of arrangement lends itself readily to the formation of a folded rectangular air cleaning array or a circular air-cleaning array.

Preferred embodiments of the invention may utilise the positioning of the electrodes or electrode material to provide particle charging by the plastics, especially fluted plastics, sheet array itself so that external charging of particles is not required.

FIG. 14 of the drawings shows an arrangement of electrode material 70 with respect to the sheet materials 72 (showing only one sheet in an array). Distances x, y and z are creepage distances provided to allow adequate insulation from one electrode (high potential) to the next (low potential both above and below it) in the sandwich of electrodes.

If distance y is reduced then leakage of high voltage current increases. By suitable selection of distances and voltages ionisation can be achieved on the face of the array by virtue of ion leakage. If ionisation is arranged to be produced on the air inlet face of the air-cleaning array, then neutral particles are charged immediately before they enter the array. This enhances the capture efficiency. If ionisation is arranged to be produced on the air exit face of the air cleaning array, then these ions are blown out into the room where they charge particles in the room prior to them being drawn and trapped in the air cleaning array.

In order to reduce the likelihood of electrostatic shock caused by handling air-cleaning array of a particle collection device of the invention, FIG. 15 of paper 80 covered with an aluminum foil connecting strip 82, two layers of paper (current surge block) 84 and an aluminium foil terminal tab 86. The paper layers are of high resistivity material to limit the current flow to a few microamperes. Another method makes use of high resistivity material connected directly between the high and low voltage electrodes. The resistivity is adjusted to a value which will not unduly load the power supply (and reduce voltage) but will discharge of the air cleaning array in a matter of a few seconds as soon as the power is switched off. In this manner the array is quickly made safe for handling.

FIG. 16 of the accompanying drawings illustrates a typical complete air cleaning system 100 for use in a room environment and FIG. 17 illustrates the air cleaning system 100 in a room environment showing particle charging and collection. The system 100 has a collector 102 in the form of an array of fluted plastics sheets and high and low potential electrodes (as in FIG. 4B) and a fan 104 for drawing air through the array in the direction of the arrows. The array and fan are enclosed between inlet grill 106 and outlet grill 108. A corona emitter 110 rear the fan ionises the air leaving the collector.

In a conventional electrostatic air-cleaner there exists an essentially uniform non-linear electric field between two parallel conducting (usually metal) plates or electrodes 112, 114 (FIG. 18).

A charged particle passing between the two plates experience a force and move (via a process termed electrophoresis) to one of the plates to which it adheres. Neutral particles passing between the two plates experience little or no force and pass through essentially without being captured.

In the embodiment of this invention in which insulating plastics twin-walled fluted sheet materials are sandwiched between high and low potential plates or electrodes, (FIG. 4B) the electric field inside the flutes is essentially non-linear.

Whereas the electric potentials on the conducting or semi-conducting plates are uniform, the field inside the flutes is non-linear. Non-linearity of the field is probably due to heterogeneous displacement of charge within the plastics material and due to the effect of the flute walls.

A charged particle passing through the flutes experiences the electric field and is deposited by electrophoresis. Neutral particles passing through the flutes experience a non-linear electric field and move (by a process termed dielectrophoresis) and are similarly deposited.

Forces act upon the neutral particles by virtue of both polarisation of the particles and non-linearity of the electric field. The result is movement and deposition of the neutral particles.

Thus in this embodiment both charged and the neutral particles are deposited. The efficiency of the deposition of charged particles is greater than that of neutral particles. However, the efficiency of deposition of neutral particles is significant.

In another embodiment the electrodes may be sealed inside a plastic sheet material to prevent the ingress of water. This allows the composite collector array to be washed clean periodically using water or detergent so that it may be dried and re-used.

As shown in FIG. 19, it is possible to replace the fluted sheet array by having electrodes 120 formed into corrugated or wave-like electrodes and the electrodes are separated using thin film 122 of plastics material.

Air is blown or drawn through the sandwich formed by the corrugations and plastic film.

For the purpose of explanation semi-conducting material is any material having a thin film resistivity of the order of about $10^9$ to $10^{11}$ ohms per square.

This invention will now be further described, by way of example only, to illustrate high efficiencies at low pressure drop with reference to FIG. 4B of the accompanying drawings.

A sheet of plastics twin-walled fluted sheet material of 300 grams per square metre with a sheet thickness of 2.1 millimetres the flute spacing of 2.7 millimetres and wall thickness of 150 microns was selected. The sheet was cut up and assembled into an air-cleaning array using 80 g.s.m. paper electrodes.

The array was sized so as to give an airflow transit depth of 70 mm. One set of electrodes was connected to ground and the other set were maintained at minus 12,000 volts.

A 0.5-micron salt aerosol of about 1 milligram per cubic metre was generated in the test room. Particle charging was achieved by diffusion charging by blowing room air over two electrodes (one at ground, the other at −12 kv) as described in FIG. 10 of the drawings.

A series of experiments was conducted using an aerosol monitor to determine the efficiency of capture of the salt particles at different air velocities through the array. The results were as follows:

| Air velocity (m/s) | Capture efficiency (%) | Pressure drop (pascals) |
| --- | --- | --- |
| 0.5 | 99.99 | 3 |
| 1.0 | 99.97 | 7 |
| 2.0 | 99.95 | 14 |
| 3.0 | 99.23 | 27 |

In yet another embodiment, the plastics twin-wall fluted sheet material is simply made into an air-cleaning array with any treatment.

With reference to FIG. 5 of the drawings, one preferred embodiment suitable to the electret charging of plastics twin-walled fluted sheet materials 10 is described below:

This comprises an array 11 of insulating plastics twin-wall fluted sheet material 9. In this embodiment there are no high and low potential plates. Instead, each individual sheet 9 is "charged" between high and low voltage electrodes, removed and then stacked to form an array 11. The effectiveness of this array to precipitate particles flowing through it is dependent on the stored electret charge within 9. A large charge may be stored by applying a very high potential difference before removing sheet material 9 and stacking in an array 11.

Removable flat metal or semi-conducting electrodes are applied to the top and bottom of the sheet material 10. A high voltage difference is applied to the two electrodes. After sufficient time for charging the high voltage is then disconnected and the electrodes removed from the newly formed electret sheet material.

The electret sheet material may now be cut up and formed simply by stacking the material into an air-cleaning array 200 (see FIG. 5). The electric fields inside the flutes effect the trapping of particles in the air stream flowing through the flutes. No external power supply is required to maintain the electric fields within the flutes because the electret charge within the plastics material is stable with respect to time (Lifetime can be many years).

In the embodiment of FIG. 20 of the drawings, it has been found advantageous (after electret charging of the sheet material) to electrically connect together both sides of each sheet 10 (all sides of all sheets in an air-cleaning array). This is done to maximise the electric field strength inside the flutes and therefore maximise the efficiency of filtration.

To electrically connect together both sides of each sheet, all of the plastics sheet surfaces need to be rendered conductive or semi-conductive. This can be done by applying a conductive paint film or an anti-static coating, or attaching paper or metal film 198 to each side of the sheet.

The conductive surfaces of all of the sheets in an array are then connected together by use of wire 202, conductive tape, semi-conducting tape, conductive coating, semi-conductive or similar means.

When connected together like this the electric field within the flute air space may be maximised and hence the efficiency of capture of particles may be maximised.

The embodiment of FIG. 20 will now be further described, by way of the following example.

A sheet of plastics twin-walled fluted sheet material 10 made from a co-polymer of ethylene and propylene was selected. The sheet weighed about 300 grams per square metre with a sheet thickness of 2.1 millimetres the flute spacing of 2.7 millimetres and a wall thickness of about 150 microns.

Paper electrodes were placed so as to sandwich the sheet material. One electrode was electrically connected to ground and the other electrode was connected to a potential of minus 33,000 volts for a period of 15 minutes. The electrodes were disconnected, removed and the electret-charged plastics sheet material was cut up and sandwiched in an array as shown in FIG. 20.

The electret sheet was cut up to give an airflow transit depth of 70 millimetres. A series of experiments was conducted using an aerosol monitor to determine the efficiency of capture of 0.5 micron salt particles at different air velocities through the array.

The results using uncharged aerosol salt particles at a concentration of about one milligram per cubic metre were as follows:

| Air velocity (m/s) | Capture efficiency (%) | Pressure drop (pascals) |
|---|---|---|
| 1 | 93 | 6 |
| 2 | 88 | 13 |
| 3 | 84 | 26 |
| 4 | 79 | 37 |
| 5 | 74 | 52 |

The results using negatively charged aerosol salt particles at a concentration of about one milligram per cubic metre were as follows:

| Air velocity (m/s) | Capture efficiency (%) | Pressure drop (pascals) |
|---|---|---|
| 1 | 99 | 6 |
| 2 | 99 | 13 |
| 3 | 99 | 26 |
| 4 | 98 | 37 |
| 5 | 96 | 52 |

Electret charging of plastics twin-wall fluted sheet material 10 may be achieved by applying an electric field to the material at higher temperature and then cooling to a lower temperature in the presence of the electric field.

FIG. 21 illustrates another means of electret charging of plastics twin-wall fluted sheet material using a high-potential corona wire 210 placed above the sheet with an earthed conductive or semi-conductive plate 212 beneath the sheet. The plastic sheet is moved slowly to effect charging along the length of the plastic sheet.

In FIG. 22 the electret charging of plastics twin-wall fluted sheet materials 10 is achieved using a high-potential corona point emitter 214 placed above the sheet with an earthed conductive or semi-conductive plate 216 beneath the sheet. The plastic sheet is moved slowly to effect charging along the length of the plastic sheet.

In order to achieve maximum charge storage in an electret material it is usually beneficial to apply a very high potential difference across the electret material. The higher the imposed potential difference, the higher the stored charged available after the imposed potentials are removed. However, the potential difference must be controlled because if it is too high dielectric breakdown takes place with a reduction of electret charge as a result.

The fluted structure of plastics twin-wall sheet material 10 lends itself to electret charging by an alternative preferred means as shown in FIG. 23. The insides of the flutes are washed through or filled with water or other liquid 220, which has been made suitably conductive. The insides of the flutes, which are now temporarily conductive, are connected to ground potential and the top and bottom surfaces of the plastics sheet are covered with conductive or semi-conductive electrodes 222, 224. The top electrode 222 is connected to a suitably high negative potential. The bottom electrode 224 is connected to a suitably high positive potential. In this manner electret charge is formed in the dielectric of the top and bottom surfaces of the sheet material.

After a suitable time the electrodes are disconnected, the conductive liquid is drained from the flutes and the flutes are air-dried. A very high electric field strength in the airspace inside the flutes is achieved in this manner.

This newly formed electret flute material can now be cut up and arranged into an air-cleaning array as shown previously.

As shown in FIG. 24 of he drawings, electret charging of plastics twin-wall fluted sheet material 10 is achieved by feeding of the sheet material slowly through rollers 230, 232 made of conductive or semi-conductive materials. The rollers are maintained at suitable high and low electrical potentials respectively. The rollers may be wet or treated with a suitable conducting liquid in order to enhance charge transfer.

The electret charging of plastics twin-wall fluted sheet material may be achieved in a manner similar to that mentioned with respect to FIG. 5, except that one of or both of the removable electrodes are wet or treated with a suitable conducting liquid in order to enhance charge transfer.

Materials other than plastics fluted sheet material may be advantageously electret charged and then used to construct air-cleaning arrays of the invention. FIG. 25 illustrates this. Rectangular section tubing 300 is electret charged by two planar electrodes 302, 304 as shown. The electret charging can be achieved using a batch process or preferably continuously.

Alternatively as shown in FIG. 26 the rectangular section plastics tubing 300 is electret charged by two L-section shaped electrodes 306.

FIG. 27 shows that circular or elliptical-section plastics tubing 310 may be electret charged by two suitably shaped electrodes 312, 314.

Once electret charged the rectangular 300 or circular 310 plastics tubes may be cut up and assembled into air cleaning arrays as shown respectively in FIG. 28.

FIG. 29 of the drawings shows an electret charged fluted array (similar to the array shown in FIG. 20) is used not as an air-cleaning device but as a charged particle detector. Charged particles entering the flutes 10 are subject to the electric field across the flutes. The particles move to the walls where they adhere and give up their charge. The charge migrates to the electrodes 198. Positively charged particles or ions move to one side of the flutes and negatively charged particles or ions move to the other side.

By ensuring correct orientation of polarised electret charged sheets and by connecting together alternate electrodes, it is possible to measure two currents, one attributable to collected positive charges (A1) and one attributable to collected negative charges (A2).

The charged particle collection capabilities of such an array can be utilised to construct a sensitive particle pollution-measuring device 400 (see FIG. 30). A brief description of such a device follows. A conductive tube 402 has an inlet grill 404 and leads to an electret array 406 of the type shown in FIG. 20. The conductive tube 402 is connected to earth. Within the tube 402 is a corona emitter needle 408. Beyond the array 406 is a fan 410 and an outlet grill 412. The array 406 is connected earth via an ammeter A to measure current resulting from charge collected on the array from captured particles.

Air is drawn into the device by the fan 410. All of the air stream is subject to monopolar corona charging (technically termed field-charging). As the particles pass through the corona charger all particles are charged. If the corona charge is negative then all particles will be charged negative regardless of the state of charge of the particles entering, i.e. positive, neutral and negative particles entering of the corona charger will exit with negative charge, If all of these negative particles are then captured in the electret, charged array 406, the current flowing from the array is proportional to the density of particles entering the device and proportional to the air flow through the device.

Such a device has a number of advantages over other particle pollution measuring devices, including high sensitivity (low pressure drop allows high air flow rate), a stable zero state (no particles, no electrical current), no leakage or interference problems (collecting array is not connected to any high voltages).

The embodiment of FIG. 30 will now be further described, by way of the following example:

A smoke aerosol was generated in the room and was drawn into a circular section conductive tube of 100 mm diameter. (Air velocity 1.5 metres per sec.). The aerosol was passed over a centrally located insulated needle held at a potential of about minus 6,000 volts. Corona discharge from the needle produced an ion current of 4.5 microamperes to electrically charge the incoming particles. All of the highly mobile excess negative ions were captured by the surrounding conductive tube. The charged particles by virtue of their low mobility were carried along in the air stream into a square electret charged array of 70 millimetre depth. The negative particles in the stream were captured in the array and gave rise to a current measured by an ammeter.

The results of an experiment are as follows:

| Aerosol concentration (micrograms/cubic meter) | Current from array (nano-amperes) |
|---|---|
| 1000 | 6.2 |
| 800 | 5.0 |
| 600 | 3.7 |
| 400 | 2.5 |
| 200 | 1.3 |
| 0 | 0.0 |

The figures demonstrate a linear relationship between aerosol concentration and current collected by the array.

The invention claimed is:

1. A particle precipitation device for removing particles entrained in a gas stream comprising an array of passages through which the gas stream can pass relatively freely, the passages being enclosed by plastics walls having electret properties imparted to external ones of said plastic walls after formation of the passages, wherein the passages are provided by fluted plastics sheet material, and wherein the charging of the walls after formation results in a substantially uniform electric field within the flutes, means for urging the gas stream through the array, whereby particles are collected from the gas stream in the passages.

2. A device as claimed in claim 1, wherein the fluted plastics sheets are overlaid one on top of the other.

3. A device as claimed in claim 1, wherein the fluted plastics sheet material is folded in concertina fashion.

4. A device as claimed in claim 1, wherein fluted plastics sheet material is formed into a spiral.

5. A device as claimed in claim 1, wherein the passages are provided by plastics tubes arranged side by side.

6. A device as claimed in claim 5, wherein the plastics tubes are of rectangular cross-section.

7. A device as claimed in claim 5, wherein the tubes are of circular cross-section.

8. A device as claimed in claim 1, wherein the plastics material is selected from a group consisting of polypropylene, polyethylene or a copolymer thereof, polyvinyl chloride, PET, PTFE and polycarbonate.

9. A device as claimed in claim 1, further comprising means for electrically charging particles in the gas stream prior to the array of passages.

10. A device as claimed in claim 1, comprising corona discharge means for electrically charging the particles in the gas stream.

11. A device as claimed in claim 1, comprising radioactive ionisation means for electrically charging the particles in the gas stream.

12. A device as claimed in claim 1, further comprising means for ionizing the gas stream as it leaves the array.

13. A device as claimed in claim 12, wherein the means for ionising the gas stream as it leaves the array comprises a primary corona discharge emitter and a secondary corona discharge emitter at a lower potential to the primary emitter.

14. A device as claimed in claim 13, wherein the primary emitter is connected to high negative potential and the secondary emitter is earthed.

15. A device as claimed in claim 13, wherein the primary emitter is a needle having a sharp tip with a radius of curvative of less than approximately 0.1 mm and the secondary emitter is a needle having a relatively blunt tip with a radius of curvative of approximately 0.5 to 2.0 mm.

16. A device as claimed in claim 1, wherein the plastics walls are charged by means of electrodes applied to opposite sides of the walls with a high voltage difference applied thereto.

17. A device as claimed in claim 1, wherein the plastics walls are charged by applying an electric field at a higher temperature and then cooling to a lower temperature in the presence of the electric field.

18. A device as claimed in claim 1, wherein the plastics walls are charged by moving the plastics walls between a high potential corona discharge on one side, and an earthed conductive plate on the other side.

19. A device as claimed in claim 1, wherein the plastics walls are provided by faces of fluted plastics sheet material and charging is by means of filling the flutes with a conductive liquid, and connecting the flute insides to ground potential and outer faces of the sheet material to high negative and positive potentials respectively.

20. A device as claimed in claim 1, wherein the plastics walls are charged by feeding them between rollers of conductive or semi-conductive material maintained at high and low potentials respectively.

21. A device as claimed in claim 16, wherein the opposite sides of the walls are rendered conductive and electrically connected.

22. A device as claimed in claim 21, wherein the opposite sides of the walls are connected to ground.

23. A device as claimed in claim 21, wherein the plastics walls are rendered conductive by application of a conductive coating or a conductive sheet material.

24. A device as claimed in claim 1, in the form of a pollution monitor, wherein the plastics walls are electrically connected to earth via an ammeter for measuring current resulting from collected particles.

25. A particle participation device for removing particles entrained in a gas stream comprising an array of passages through which the gas stream can pass relatively freely, the passages being provided by fluted plastics sheet material having external walls connected by internal walls, the fluted plastics sheet material having electret properties imparted to the external walls thereof after formation of the fluted plastics sheet material so as to produce a substantially uniform electric field within the passages defined by the flutes, and means for urging the gas stream through the array, whereby particles are collected from the gas stream in the passages.

26. A particle participation device according to claim 25 wherein the electric field is substantially orthogonal to both external walls.

27. A particle participation device according to claim 25 formed by a process comprising the steps of forming the fluted plastics sheet material with opposing external walls connected to each other by the internal walls, the internal walls defining the passages; applying opposite charges to the external walls so as to produce the substantially uniform electric field within the passages defined by the flutes, the electric field being substantially orthogonal to both external walls.

* * * * *